United States Patent [19]

Masukawa et al.

[11] Patent Number: 5,073,920

[45] Date of Patent: Dec. 17, 1991

[54] METHOD AND APPARATUS OF MEASURING A SUBSCRIBER LINE

[75] Inventors: Hirohumi Masukawa, Yokohama; Makoto Hisamura, Fujisawa, both of Japan

[73] Assignee: Hitachi, Ltd., Tokyo, Japan

[21] Appl. No.: 570,113

[22] Filed: Aug. 17, 1990

[30] Foreign Application Priority Data

Nov. 22, 1989 [JP] Japan .................................. 1-302104

[51] Int. Cl.$^5$ .......................... H04B 3/46; H04M 1/24
[52] U.S. Cl. ...................................... 379/30; 324/523; 324/541; 178/63 R
[58] Field of Search ....................... 379/30, 24, 26, 30; 324/523, 525, 537, 541, 523, 541; 178/63 R

[56] References Cited

U.S. PATENT DOCUMENTS 4,320,338  3/1982  Morris et al. ......................... 379/24
4,845,737  7/1989  Ohlendorf et al. ................... 379/30

OTHER PUBLICATIONS

"Measuring Device for Test of Subscriber Line Using Electronic Circuit", the 1981 National Convention 408 of Information and System Part of the Institute of Electronics, Communication Engineers of Japan.
IEEE, "Subscriber Line Testing for Digital Switching Office", vol. 29, No. 10, pp. 1434-1441.

Primary Examiner—Stafford D. Schreyer
Attorney, Agent, or Firm—Antonelli, Terry, Stout & Kraus

[57] ABSTRACT

A subscriber line measuring method and apparatus can charge a line capacitance of a telephone subscriber line in a very short time as compared with a prior art by charging the line capacitance by a predetermined current without use of a high resistor (100 kΩ) in a conventional measuring apparatus, and thereby can measure an impedance of the telephone subscriber line in a very short time with high accuracy.

11 Claims, 6 Drawing Sheets

F I G. 1
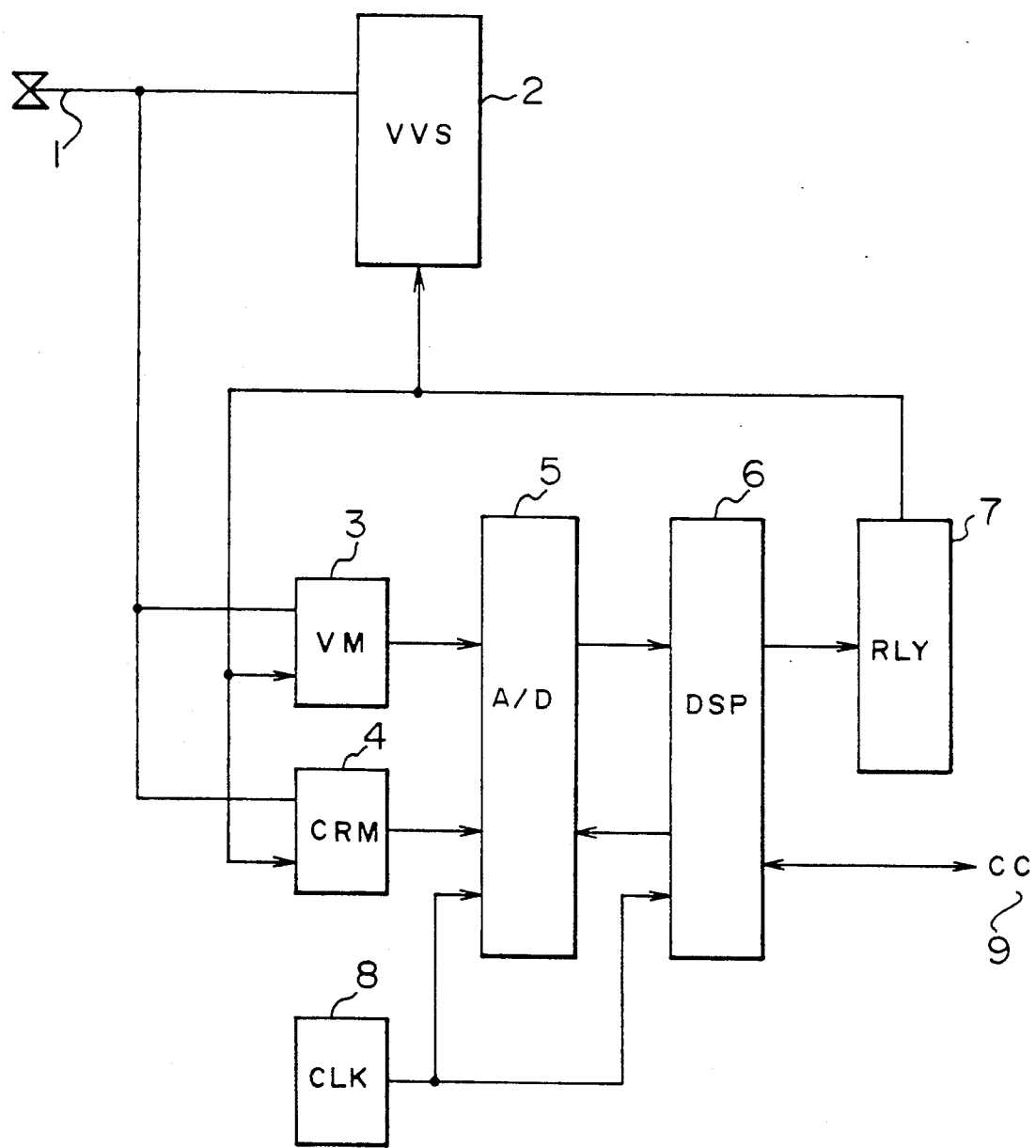

METHOD AND APPARATUS OF MEASURING A SUBSCRIBER LINE

BACKGROUND OF THE INVENTION

The present invention relates to a method and apparatus for measuring a telephone subscriber line exhibiting an impedance including resistors and capacitors connected in series-parallel form by means of a voltage controlled power source, a high-speed current measuring circuit and a signal processing technique from a telephone office in a short time with high accuracy.

In order to measure a capacitance of a telephone connected across a telephone line or a subscriber line, heretofore, the capacitance is charged sufficiently to a predetermined voltage through a high resistor and after the electric charges stored in the capacitance is discharged through the high resistor to a reference capacitor in a measuring device, a voltage stored in the reference capacitor is measured to calculate the capacitance of the telephone. The reason why the capacitor is charged and discharged through the high resistor is that the telephone is prevented from wrongly ringing by the charged and discharged current flowing through a subscriber's telephone in the measurement.

In order to prevent the wrong ringing of the telephone having a current sensitivity of 0.5 mA in a power supply of −48 V, it is necessary to charge and discharge the capacitance through a resistor of 100 kΩ or more. On the other hand, a time for charging and discharging the capacitance of the telephone of 3 μF at the maximum through the resistor of 100 kΩ is considerably long and a charging or discharging time to 99% is 1.5 seconds.

Accordingly, a single measurement time is 3 seconds or more because of the charging and discharging time. Further, 9 seconds is required to measure three capacitances between the A line and the ground, the B line and the ground, and the A line and B line.

In a conventional measurement device, in order to measure an insulation resistance between the lines, a predetermined voltage is applied across the lines through a high reference resistor in the measurement device so that a line voltage at this time is measured to calculate the insulation resistance. In this case, it is required to measure the insulation resistance after the capacitance between the lines is charged sufficiently and the line voltage reaches a voltage obtained by dividing a voltage in the telephone office by the high reference resistor in the measurement device and the insulation resistance.

When the high reference resistor in the measurement device is 100 kΩ and the maximum capacitance across the lines is 3 μF, the charging time to 99% is 1.5 seconds. Accordingly, a single measurement time is 1.5 seconds or more because of the charging time and three measurements including measurement of an insulation resistance between the A line and the ground, measurement of an insulation resistance and capacitance between the B line and the ground, and measurement an insulation resistance between the A and B lines require 4.5 seconds.

Further, in the conventional device, in order to exactly measure an external voltage on the lines, it is necessary to discharge electric charges across the lines through a high resistor. The reason why the electric charges are discharged through the high resistor is the same as in the above-mentioned measurement of the capacitance across the lines. In this case, a single measurement time is also 1.5 seconds or more because of the discharging time and two measurements including measurement of an external voltage and resistance between the A line and the ground and measurement of an external voltage between the B line and the ground require 3 seconds or more.

The foregoing is the reason of requiring a long time for the measurement due to the line capacitance, while each measurement of a voltage requires 0.5 second or more as a delay time of a low pass filter in order to remove a component of 10 V at the maximum of A.C. commercial frequency 50 Hz induced on the lines by means of the low pass filter.

The total time for all of the measurements is 20 seconds or more. Even if two measurement circuits are used to measure the A and B lines simultaneously, the total time for the measurements is 10 seconds or more, and the rationalization for maintenance and test is prevented.

The prior art technique is described in "Measuring Device for Test of Subscriber Line Using Electronic Circuit", the 1981 National Convention 408 of Information and System Part of the Institute of Electronics and Communication Engineers of Japan, and IEEE "Subscriber Line Testing for Digital Switching Office", Vol. 29, No. 10, pp. 1434-1441.

The prior art technique requires a long time for measurement of the telephone subscriber line and has a long charging and discharging time. Accordingly, remaining electric charges produce measurement error and measurement accuracy is also insufficient.

SUMMARY OF THE INVENTION

It is an object of the present invention to provide a subscriber line measuring method and apparatus capable of measuring an impedance of a telephone subscriber line in a short time with high accuracy.

It is another object of the present invention to solve the problems in the prior art by the provision of a voltage controlled power source and a high speed current measuring circuit and using the signal processing technique.

In order to charge and discharge a line capacitance in a short time, the capacitance is charged and discharged through a constant impedance, while in order to prevent wrong ringing of a subscriber telephone, it is necessary to suppress a charging and discharging current for each telephone to 0.5 mA or less.

In the conventional device, since a voltage of −48 V is employed and one to three telephones each having a capacitor of 1 μF are connected across the lines, the maximum line capacitance of 3 μF is charged and discharged through a resistor of 100 kΩ. This method requires 1.5 seconds at the maximum equal to five times a time constant in order to charge and discharge the capacitance to the final value of 99%.

Thus, if the charging and discharging operation is performed by a constant current source of 0.5 mA instead of the constant resistance of 100 kΩ, the charging and discharging operation is completed in a time corresponding to a time constant of 300 ms.

Further, in the present invention, the charging and discharging operation is made by a voltage controlled power source having a voltage varying from −48 V to 0 V at steps of 100 ms so that the charging and discharging operation is completed in 100 ms. In this voltage controlled charging and discharging operation, however, the charging and discharging current is proportional to the line capacitance and is 1.5 mA for 3 μF. Accordingly, since the capacitance per telephone is 1 μF or less, the charging and discharging current therefor is 0.5 mA or less.

In the conventional device, the predetermined voltage is applied across the line through the high reference resistor in the measuring device so that the insulation resistance across the line is calculated on the basis of a line voltage at this time. In this case, it takes a long time since the insulation resistance is measured after the capacitance between the lines is charged sufficiently and the line voltage reaches a voltage obtained by dividing a voltage in the telephone office by the high reference resistor in the measurement device and the insulation resistance.

In the present invention, the charging time is reduced by the voltage controlled charging operation and the insulation resistance across the line is calculated in a short time on the basis of a leakage current value after charged. At the same time, the line capacitance is calculated from a current-time product, that is, an amount of electric charges during the charging time to effect reduction of time and high accuracy.

Further, in the conventional device, in order to remove noise component such as A.C. commercial frequency (50 Hz or 60 Hz) and aural signal induced on the line by a low pass filter, each measurement requires 0.5 second as a delay time of the filter.

Generally, in order to separate D.C. voltage to be measured from the noise component such as A.C. commercial frequency 50 Hz completely, the delay time of 0.5 second by the filter is avoided.

However, the present invention utilizes the fact that most of the A.C. noise induced on the line is 50 or 60 Hz component and its higher harmonics so that the delay time by the filter is reduced to 100 ms.

More particularly, the property that A.C. noise is reduced to zero when an average value of a time equal to the integral multiple of a period of the noise is calculated is utilized to calculate an average value for 100 ms equal to an integral multiple of a period for 50 or 60 Hz frequency noise and its higher harmonics so that the 50 or 60 Hz frequency noise and its higher harmonics are removed completely. Since a signal level of aural signal is small and its frequency is 300 Hz or more, the aural signal is attenuated sufficiently when an average value for 100 ms is calculated so that exact D.C. component is obtained.

Since the charging and discharging operation is made by means of the constant current source instead of utilization of a constant resistor in the prior art, the charging and discharging operation is completed in a time corresponding to a time constant. Further, the charging and discharging operation is made by means of the voltage controlled power source having a voltage varying from −48 V to 0 V to complete the charging and discharging operation.

Furthermore, the charging time is shortened by the voltage controlled charging operation and an insulation resistance across the lines is calculated in a short time from a leakage current value after charged. At the same time, the line capacitance is calculated from a current-time product, that is, an amount of electronic charges during the charging time to effect reduction of time and high accuracy.

BRIEF DESCRIPTION OF THE DRAWINGS

FIG. 1 is a block circuit diagram of a subscriber line measuring apparatus according to an embodiment of the present invention;

DESCRIPTION OF THE PREFERRED EMBODIMENTS

An embodiment of the present invention is now described with reference to FIGS. 1 to 8.

FIG. 1 is a functional block diagram. VVS 2 represents a controlled voltage source, VM 3 represents a voltage measuring device, CRM 4 represents a capacitance and resistance measuring device, A/D 5 represents an analog-to-digital converter, DSP 6 represents a digital signal processor, and RLY 7 represents a relay circuit. CLK 8 produces various clocks necessary for the A/D 5 and the DSP 6.

The DSP 6 operates the RLY 7 in response to a command from a central control unit CC9 to pull a subscriber line into the apparatus or to connect the subscriber line to the apparatus and control the VVS 2. Analog values measured by the VM 3 and CRM 4 are converted into digital values by the A/D 5 and are processed by the DSP 6 to remove noise and calculate a voltage, a resistance and a capacitance. After calculation, measured results are sent to the central control unit CC9.

Figure 2:
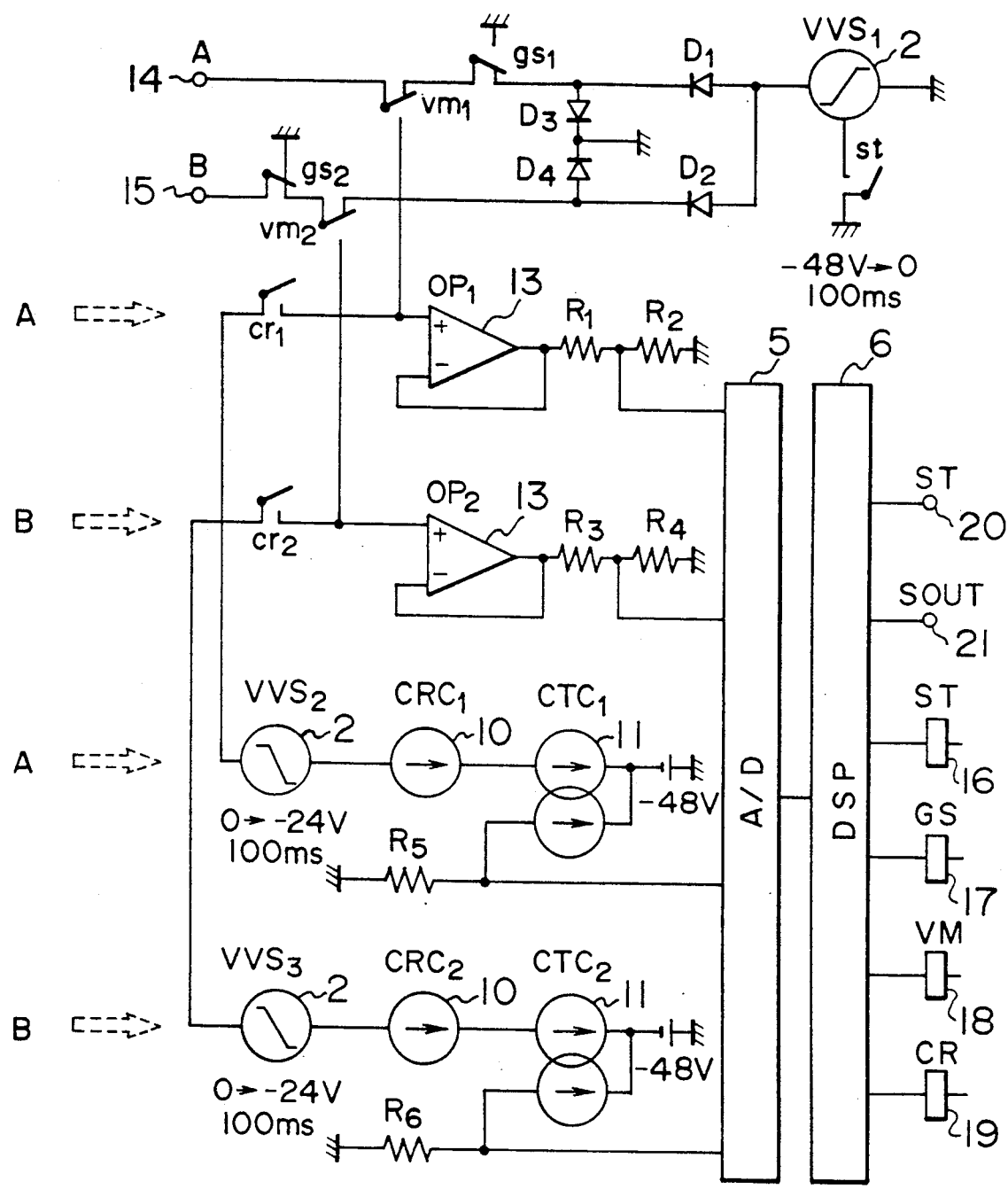
FIG. 2 is a diagram illustrating operational function of the subscriber line measuring apparatus.

In FIG. 2, ST, GS, VM and CR in upper case letters and lower case letters represent windings and contacts of relays, respectively.

$D_1$-$D_4$ represent rectifiers, $R_1$-$R_6$ resistors, $OP_1$ and $OP_2$ operational amplifiers, $VVS_1$-$VVS_2$ controlled voltage sources, $CRC_1$ and $CRC_2$ current limiting circuits, $CTC_1$ and $CTC_2$ current transmission circuits, A/D 5 an analog-to-digital converter, and DSP 6 a digital signal processor.

Figure 3:
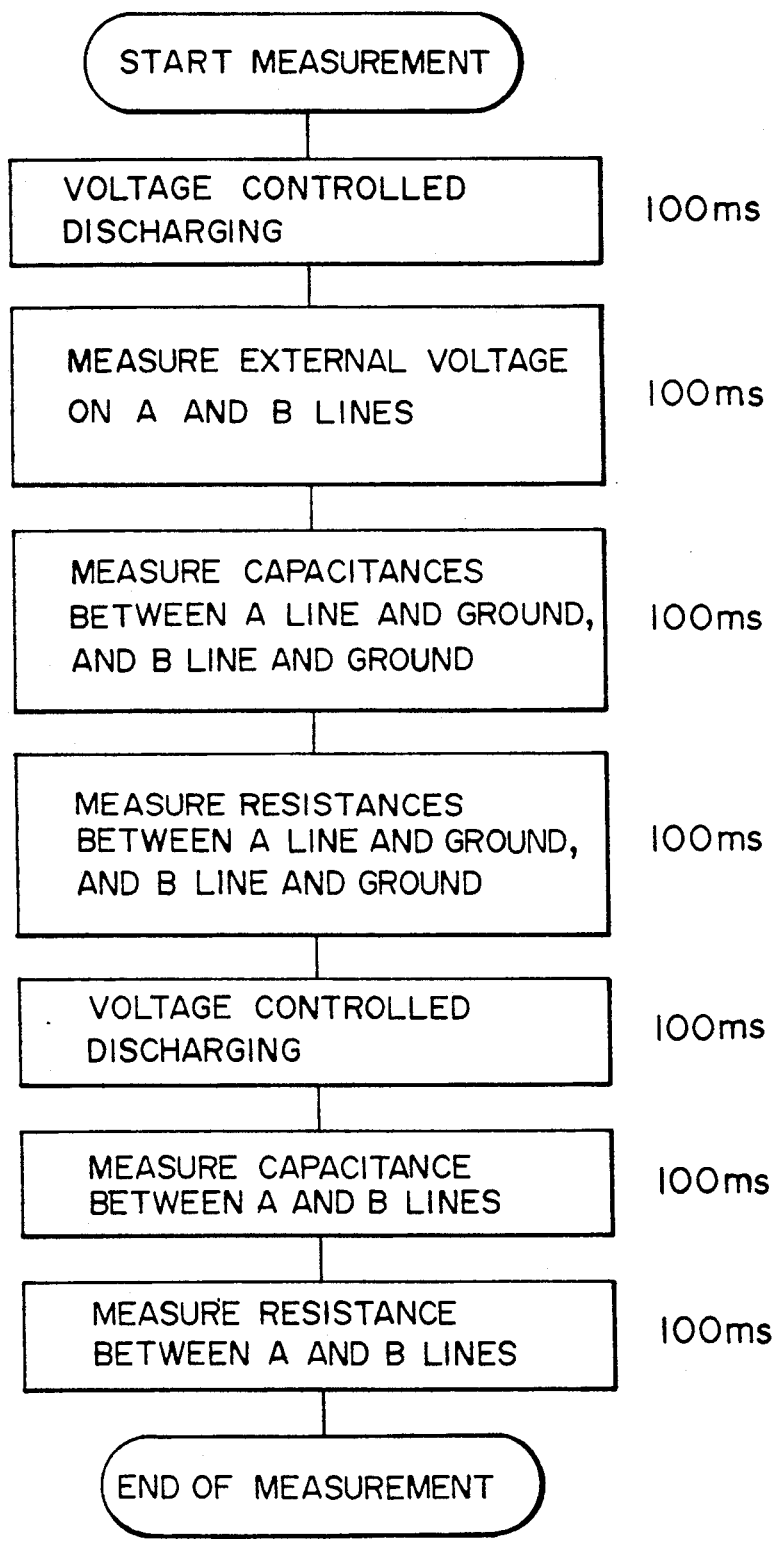
FIG. 3 is a flow chart illustrating operation of the subscriber line measuring apparatus of the present invention.

As shown by a flow chart for measurement in FIG. 3, in response to a measurement start command, a voltage controlled discharging operation is made for 100 ms and external voltages on A and B lines are measured in 100 ms.

In FIG. 2, the measurement start command supplied from a terminal ST20 is received by the digital signal processor DSP to operate the relay ST16. The controlled voltage source $VVS_1$ is started through a contact st of the relay ST16 and supplies a voltage varying from −48 V to 0 V to the A line 14 and the B line 15. During this time, electric charges on the A line 14 and the B line 15 are discharged through the rectifiers $D_1$ and $D_2$ or $D_3$ and $D_4$. Thereafter, the digital signal processor DSP6 operates the relay GS17 for a constant time to connect the A line 14 and the B line 15 to ground through contacts $gs_1$ and $gs_2$ of the relay GS17 so that remaining electric charges are discharged completely.

After completion of discharge, the digital signal processor DSP6 operates the relay VM18 to connect the A line 14 and the B line 15 to the operational amplifiers $OP_1$ and $OP_2$ through contacts $vm_1$ and $vm_2$ of the relay VM18, respectively. The operational amplifiers $OP_1$ and $OP_2$ and resistors $R_1$ to $R_4$ serve to convert a level of external voltages into a level suitable to the analog-to-digital converter A/D5. The analog-to-digital converter A/D5 and the digital signal processor DSP6 measure external voltage for 100 ms and calculate a D.C. component and an A.C. component of the external voltage to produce the calculated result through a terminal SOUT21.

As shown by the flow chart for measurement in FIG. 3, a capacitance between the A line and the ground and a capacitance between the B line and the ground are measured for next 100 ms simultaneously. That is, variations in a voltage value and a current value are measured for 100 ms and a capacitance between the A line and the ground and a capacitance between the B line and the ground are measured.

In FIG. 2, the digital signal processor DSP6 operates a relay CR19 to connect the A line 14 and the B line 15 to the controlled voltage sources $VVS_2$ and $VVS_3$ through contacts $cr_1$ and $cr_2$ of the relay CR19. The controlled voltage sources $VVS_2$ and $VVS_3$ supplies a voltage varying from 0 V to $-24$ V to the A line 14 and the B line 15 in 100 ms. During this time, the capacitance between the A line and the ground and the capacitance between the B line and the ground are charged by a current of 240 $\mu$A flowing through the current limiting circuits $CRC_1$ and $CRC_2$.

If this charging current is 240 $\mu$A or less, that is, if the line capacitance is 1 $\mu$F or less, a substantially constant charging current proportional to the line capacitance flows in accordance with the voltage variation of the controlled voltage sources $VVS_2$ and $VVS_3$. On the other hand, if the line capacitance is 1 $\mu$F or more, a charging current of 240 $\mu$A which is limited by the current limiting circuits $CRC_1$ and $CRC_2$ flows so that the line voltage is increased at a substantially constant speed. Further, the current transmission circuits $CTC_1$ and $CTC_2$ function to cause a current having the same magnitude as that of the line current to flow through resistors $R_1$ and $R_6$ and produce voltages proportional to the line current across each of the resistors $R_5$ and $R_6$.

The analog-to-digital converter A/D5 and the digital signal processor DSP6 measure the line voltage and the line current for 100 ms to calculate the capacitance between the A line and the ground and the capacitance between the B line and the ground and produce the calculated results to the terminal SOUT21.

As shown by the flow chart for measurement in FIG. 3, a resistance between the A line and the ground and a resistance between the B line and the ground are measured simultaneously in next 100 ms. That is, average values of a voltage and a current for 100 ms are measured to calculate the resistance between the A line and the ground and the resistance between the B line and the ground.

In FIG. 2, subsequently to the measurement of the capacitances, the controlled voltage sources $VVS_2$ and $VVS_3$ continue to supply a voltage of $-24$ V to the A line 14 and the B line 15. The digital signal processor DSP6 measures the line voltage and the line current for 100 ms and calculates the resistance between the A line and the ground and the resistance between the B line and the ground on the basis of average values of the measured line voltage and line current to produce the calculated results to the terminal SOUT21.

As shown by the flow chart for measurement in FIG. 3, the voltage controlled discharging operation is made for next 100 ms in the same manner and a capacitance between the A and B lines is then measured in 100 ms. Further, a resistance between the A and B lines is measured in next 100 ms.

In FIG. 2, the digital signal processor DSP6 relates the relays VM18 and CR19 and reoperates the relay ST16. The controlled voltage source $VVS_1$ is also reoperated and discharges electric charges on the A line 14 and the B line 15. Then, the digital signal processor DSP6 operates the relay GS17 to connect the B line to the ground through a contact $gs_2$ of the relay GS17.

While the B line is connected to the ground, the line capacitance and the line resistance are measured in the quite same manner as above. That is, the capacitance between the A and B lines and the resistance between the A and B lines are measured.

Figure 4:
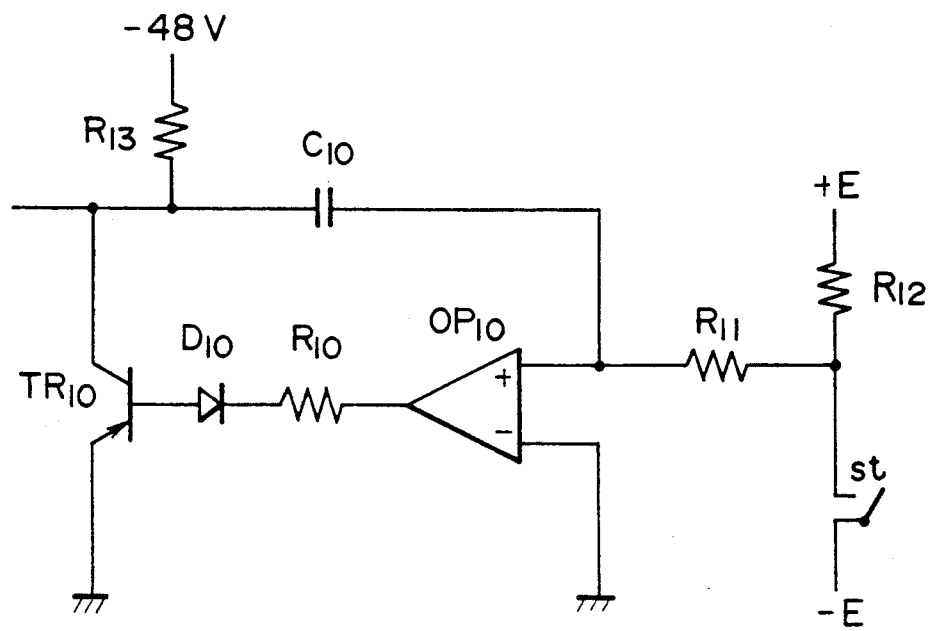
FIG. 4 is a circuit diagram schematically showing a voltage control charging and discharging circuit.
Figure 5:
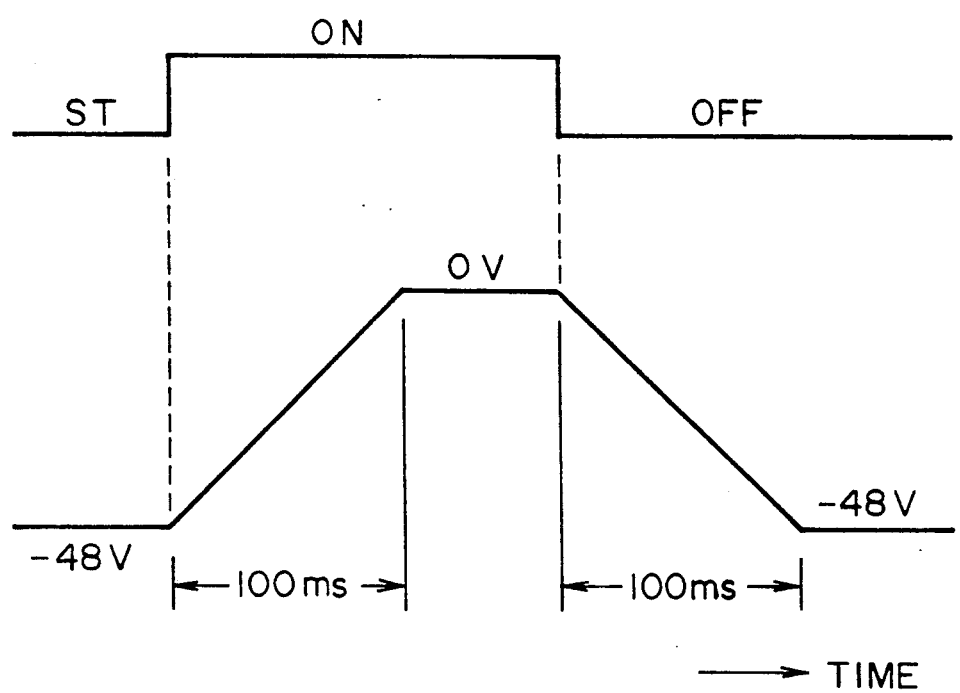
FIG. 5 is a diagram showing voltage waveforms in the voltage controlled charging and discharging circuit.

FIG. 4 is a diagram showing a voltage controlled charging and discharging circuit, in which st represents a contact of a relay. Further, $D_{10}$ represents a rectifier, $R_{10}$-$R_{13}$ resistors, $C_{10}$ a capacitor, $OP_{10}$ an operational amplifier, and $TR_{10}$ a transistor. FIG. 5 shows waveforms of output voltages in the circuit shown in FIG. 5.

When the contact st is opened, an output of the operational amplifier $OP_{10}$ is a positive potential and the transistor $TR_{10}$ is off with an output voltage of the transistor $TR_{10}$ equal to a voltage $-48$ V of a power source.

When the contact st is closed, the output of the operational amplifier $OP_{10}$ is a negative potential and the transistor $TR_{10}$ is on. The output voltage of the transistor is gradually changed from the voltage $-48$ V of the power source to 0 V. The time proportional to the resistor R11 and the capacitor $C_{10}$ and inversely proportional to a signal voltage $-E$ is set to 100 ms. Further, to the contrary, when the contact st is opened, the output voltage of the transistor $TR_{10}$ is gradually changed from 0 v to the voltage $-48$ of the power source.

Figure 6:
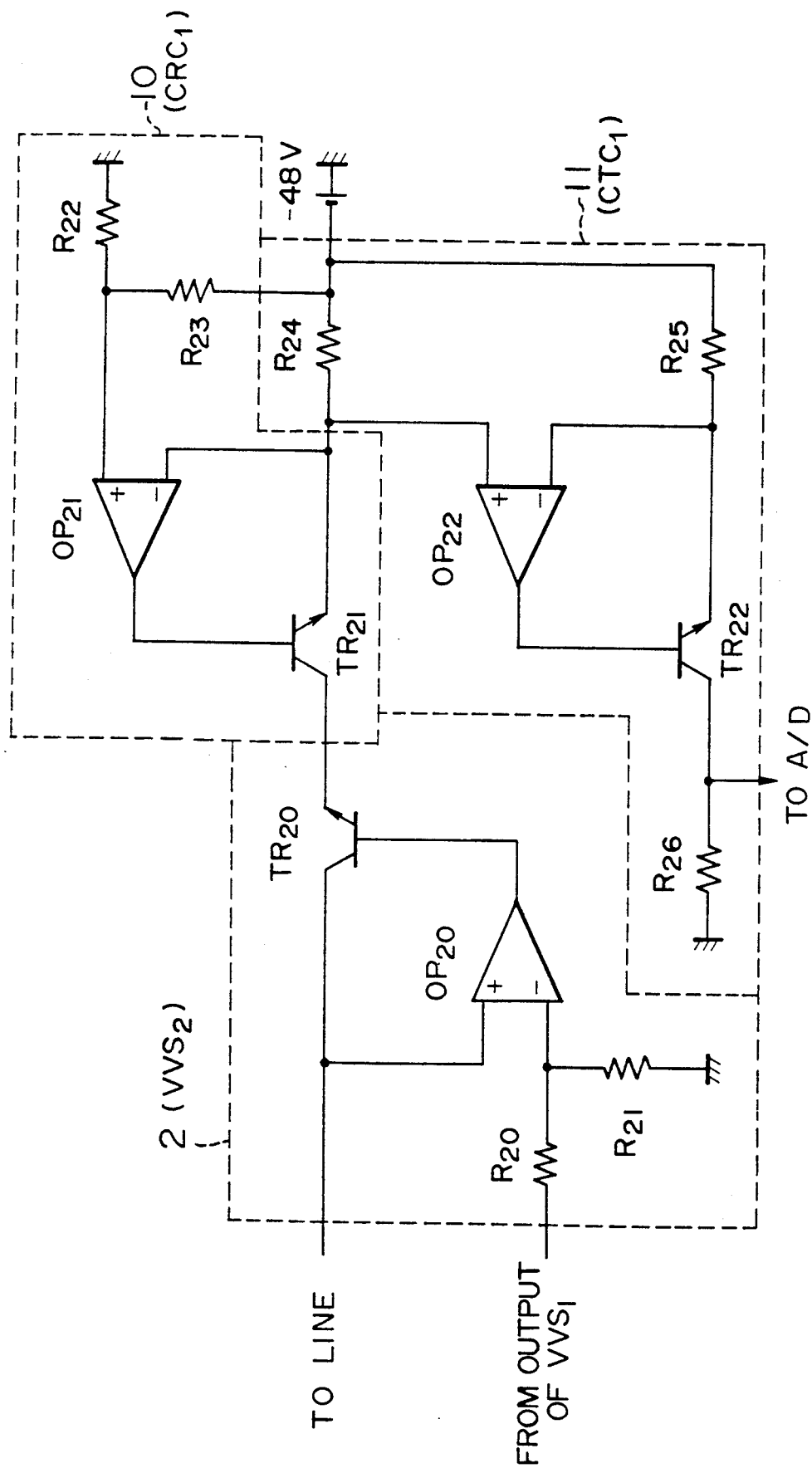
FIG. 6 is a circuit diagram for measuring a capacitance across telephone lines and an insulation resistance across the lines in the embodiment.
Figure 7:
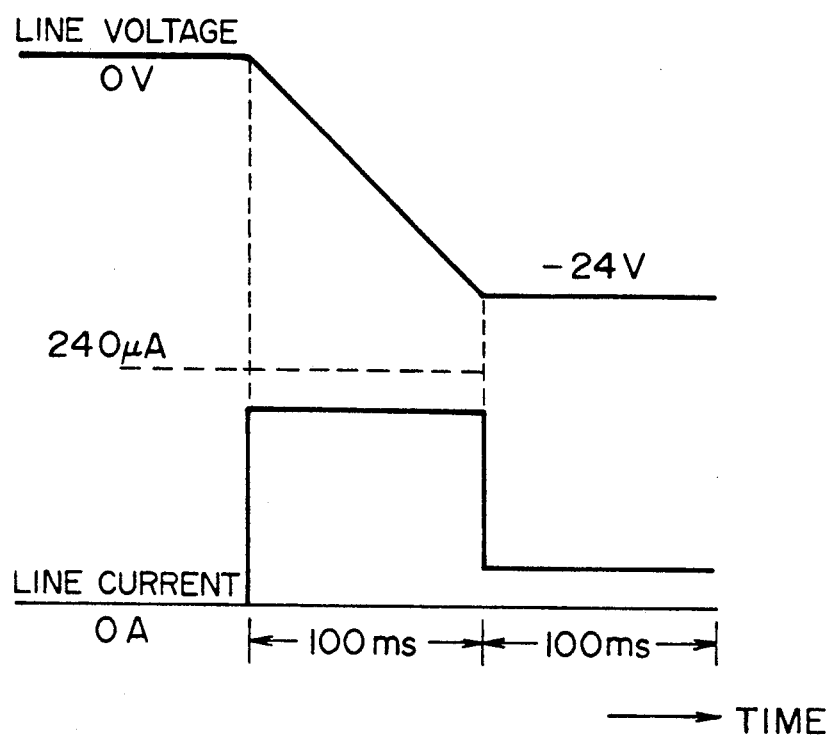
FIGS. 7 and 8 are diagrams showing line voltage waveforms and line current waveforms.
Figure 8:
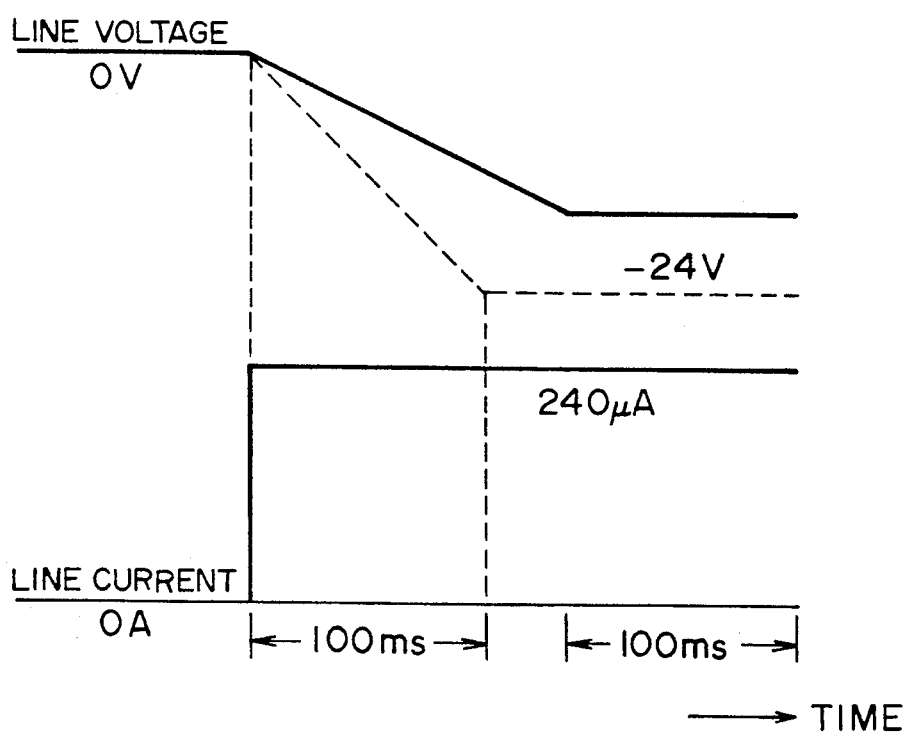

FIG. 6 shows a circuit for measuring a line capacitance and an insulation resistance between the lines. $R_{20}$-$R_{26}$ represents resistors, $OP_{20}$-$OP_{22}$ operational amplifiers, and $TR_{20}$-$TR_{22}$ transistors. Further, FIGS. 7 and 8 show line voltage waveforms and line current waveforms in the circuit of FIG. 6.

An output voltage of the controlled voltage source $VVS_1$ varying from 0 V to $-48$ V in 100 ms is divided into a half thereof by the resistors $R_{20}$ and $R_{21}$ and applied to a "$-$" terminal of the operational amplifier $OP_{20}$. The operational amplifier $OP_{20}$ turns on the transistor $TR_{20}$ in accordance with the variation of the voltage varying from 0 V to $-24$ V and controls to flow a line current so that the line voltage is equal to that voltage.

The line current at this time is different depending on the line impedance, while if it is supposed that there are a line capacitance and a line resistance, the current contains a charging current to the line capacitance upon variation of the voltage and a leakage current in the stable state of the voltage. FIG. 7 shows an example of the line voltage and the line current.

The operational amplifier $OP_{21}$ monitors the line current on the basis of a terminal voltage of the resistor $R_{24}$ and controls the transistor $TR_{21}$ so that the line current does not exceed a current value (240 μA) set by the resistors $R_{23}$ and $R_{24}$. If the line capacitance is 1 μF or more or if the insulation resistance is 100 kΩ or less, there is a tendency that the line current of 240 μA or more flows but the line current is limited to 240 μA by the current limiting circuit. Accordingly, there is a case that the line voltage is not lowered to −24 V. An example of this case is shown in FIG. 8.

According to the present invention, the measurement of the telephone subscriber line which prevents the rationalization of maintenance and test due to required long time and insufficient measurement accuracy can be implemented in a short time with high accuracy to promote the rationalization and the automatization of maintenance and test.

We claim:

1. A subscriber line measuring method of measuring an insulation resistance and a capacitance between a telephone subscriber line and ground constituting an impedance between the telephone subscriber line and ground from a telephone office, comprising:

a step of applying a voltage varying continuously with respect to ground to the telephone subscriber line;

an integrated value calculating step of calculating an integrated value and a potential difference of a line current to be measured within a period of applying the varying voltage;

a step of calculating the capacitance between the telephone subscriber line and the ground on the basis of the integrated value calculated in said first integrated value calculating step;

a step of applying a voltage fixed with respect to the ground to the telephone subscriber line;

an average value calculating step of calculating an average value of the line current to be measured within a period of applying the fixed voltage; and a step of calculating an insulation resistance between the telephone subscriber line and the ground on the basis of the average value calculated in the second average value calculating step.

2. A subscriber line measuring method of measuring an insulation resistance and a capacitance between a telephone subscriber line having two wires and ground constituting an impedance between the telephone subscriber line and ground from a telephone office, comprising:

a step of applying a voltage varying continuously with respect to ground and having the same potential to the two wires of the telephone subscriber line simultaneously;

an integrated value calculating step of calculating an integrated value and a potential difference of the line current to be measured within a period of applying the varying voltage;

a step of calculating capacitances between the two wires constituting the telephone subscriber line and ground;

a step of applying a voltage fixed with respect to ground and having the same potential to the two wires constituting the telephone subscriber lines simultaneously; and a step of calculating an insulation resistor between the telephone subscriber line and ground.

3. A subscriber line measuring method of measuring a resistance and a capacitance between two wires constituting a telephone subscriber line constituting an impedance between the two wires from a telephone office, comprising:

a step of applying a voltage varying continuously between the two wires;

an integrated value calculating step of calculating an integrated value and a potential difference of a line current to be measured within a period of applying the varying voltage;

a step of calculating a capacitance between the two wires on the basis of an average value calculated in said third integrated value calculating step;

a step of applying a fixed voltage between the two wires;

an average value calculating step of calculating an average value of the line current to be measured within a period of applying the fixed voltage; and a step of calculating an insulation resistance between the two wires on the basis of the average value calculated in said fourth average value calculating step.

4. A method according to claim 1, comprising a step of measuring the line current in a period equal to an integral multiple of a maximum period of external noise on the telephone subscriber line or in a period equal to a value obtained by dividing a minimum period of the external noise by an integral number, and a step of calculating an average value of the line current by simply averaging the measured value.

5. A method of according to claim 3, comprising a step of measuring the line current in a period equal to an integral multiple of a maximum period of external noise on the telephone subscriber line or in a period equal to a value obtained by dividing a minimum period of the external noise by an integral number, and a step of calculating an average value of the line current by simply averaging the measured value.

6. A method according to claim 1, comprising a step of measuring a voltage value in a period equal to an integral multiple of a maximum period of external noise on the telephone subscriber line or in a period equal to a value obtained by dividing a minimum period of the external noise by an integral number to measure a voltage of the external noise, a step of calculating a simple average value and a square-average value during the period, a step of completely removing external noise component having a period equal to a value obtained by dividing a period to be measured by an integral number on the basis of the calculated simple average value and square-average value, and a step of separating a D.C. voltage component and an A.C. voltage component after the removal of the external noise component.

7. A method according to claim 3, comprising a step of measuring a voltage value in a period equal to an integral multiple of a maximum period of external noise on the telephone subscriber line or in a period equal to a value obtained by dividing a minimum period of the external noise by an integral number to measure a voltage of the external noise, a step of calculating a simple average value and a square-average value during the period, a step of completely removing external noise component having a period equal to a value obtained by dividing a period to be measured by an integral number on the basis of the calculated simple average value and square-average value, and a step of separating a D.C. voltage component and an A.C. voltage component after the removal of the external noise component.

8. A method according to claim 1, comprising a step of applying a voltage varying continuously from a voltage of a power source to a ground potential to the telephone subscriber line constituted of two wires, and a step of discharging electric charges on the line in a short time.

9. A method according to claim 3, comprising a step of applying a voltage varying continuously from a voltage of a power source to a ground potential to the telephone subscriber line constituted of two wires, and a step of discharging electric charges on the line in a short time.

10. A subscriber line measuring apparatus comprising a first voltage source for applying a voltage varying continuously with respect to ground to a telephone subscriber line, a second voltage source for applying a voltage having the same potential fixed with respect to the ground to the telephone subscriber line, and a calculation circuit for calculating an insulation resitance and a capacitance between the telephone subscriber line and ground on the basis of an average value and an integrated value of a line current to be measured within the periods of applying the two voltages by said first and second voltage sources.

11. A subscriber line measuring apparatus comprising a first voltage source for applying a voltage varying continuously between two wires constituting a telephone subscriber line, a second voltage source for applying a fixed voltage having the same potential between the two wires constituting the telephone subscriber line, a calculation circuit for calculating an insulation resistance and a capacitance between the telephone subscriber line and ground on the basis of an average value and an integrated value of a line current to be measured within the periods of applying the two voltages by said first and second voltage sources.

* * * * *